US009322392B2

(12) United States Patent
Anderson

(10) Patent No.: US 9,322,392 B2
(45) Date of Patent: Apr. 26, 2016

(54) ENCLOSED VERTICAL AXIS FLUID ROTOR

(71) Applicant: No Fossil Energy, LLC, Odenton, MD (US)

(72) Inventor: Bruce Elliot Anderson, Odenton, MD (US)

(73) Assignee: No Fossil Energy, LLC, Odenton, MD (US)

( * ) Notice: Subject to any disclaimer, the term of this patent is extended or adjusted under 35 U.S.C. 154(b) by 140 days.

(21) Appl. No.: 14/295,174

(22) Filed: Jun. 3, 2014

(65) Prior Publication Data

US 2014/0356130 A1    Dec. 4, 2014

Related U.S. Application Data

(63) Continuation of application No. 12/905,058, filed on Oct. 14, 2010, now Pat. No. 8,790,069.

(60) Provisional application No. 61/283,988, filed on Dec. 10, 2009, provisional application No. 61/272,626, filed on Oct. 14, 2009.

(51) Int. Cl.
*F03D 11/00*     (2006.01)
*F03D 3/00*      (2006.01)
*F03D 3/02*      (2006.01)
*F03D 3/06*      (2006.01)
*F03D 9/00*      (2006.01)

(52) U.S. Cl.
CPC  *F03D 3/005* (2013.01); *F03D 3/02* (2013.01); *F03D 3/062* (2013.01); *F03D 3/064* (2013.01); *F03D 3/065* (2013.01); *F03D 9/008* (2013.01); *F05B 2240/211* (2013.01); *F05B 2240/50* (2013.01); *Y02E 10/74* (2013.01)

(58) Field of Classification Search
CPC ........... F03D 3/02; F03D 3/005; F03D 3/064; F03D 3/065; F03D 3/062; F03D 9/008; F05B 2240/211; F05B 2240/50; Y02E 10/74
See application file for complete search history.

(56) References Cited

U.S. PATENT DOCUMENTS

| 1,697,574 A | 1/1929 | Savonius |
| 4,313,710 A * | 2/1982 | La Ferte ................ F03D 3/0409 415/4.2 |
| 5,391,926 A * | 2/1995 | Staley ................... F03D 3/0409 290/44 |
| 5,494,407 A | 2/1996 | Benesh |
| 7,314,346 B2 | 1/2008 | Vanderhye et al. |

* cited by examiner

*Primary Examiner* — Igor Kershteyn
(74) *Attorney, Agent, or Firm* — Kenneth P. Waszkiewicz, Attorney at Law

(57) ABSTRACT

A enclosed vertical axis fluid rotor used as a wind turbine of two designs having multiple sails that are concave on the inside and convex on the outer side which allows omni-directional wind or other fluids to engage sails to create optimum fluid momentum. These are sectional segmentation of each rotor that can be stacked upon one another at locating lug points to be attached to each rotor to keep radial alignment precise during assembly. The preferred embodiment would be of composite materials or plastics that can be molded to a given design of three or more stages. The advantage of this turbine is using the fluids to their optimum efficiency. These designs have low starting speed, low precession, and low drag. One design has a central axis that turns with bearings with the rotor and the other design is a central static (non-turning) axis shaft that allows the turbine to turn on bearings.

14 Claims, 5 Drawing Sheets

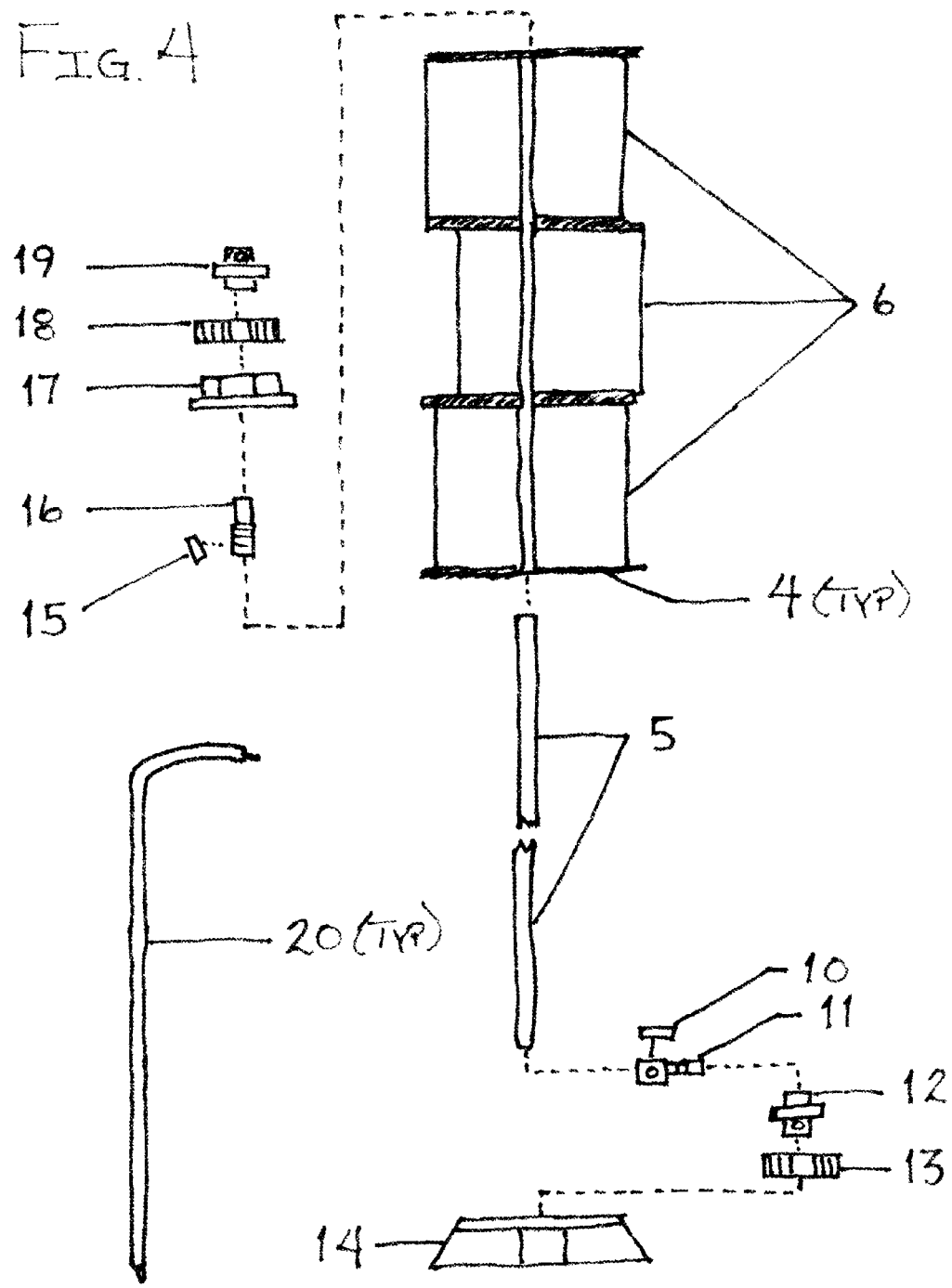

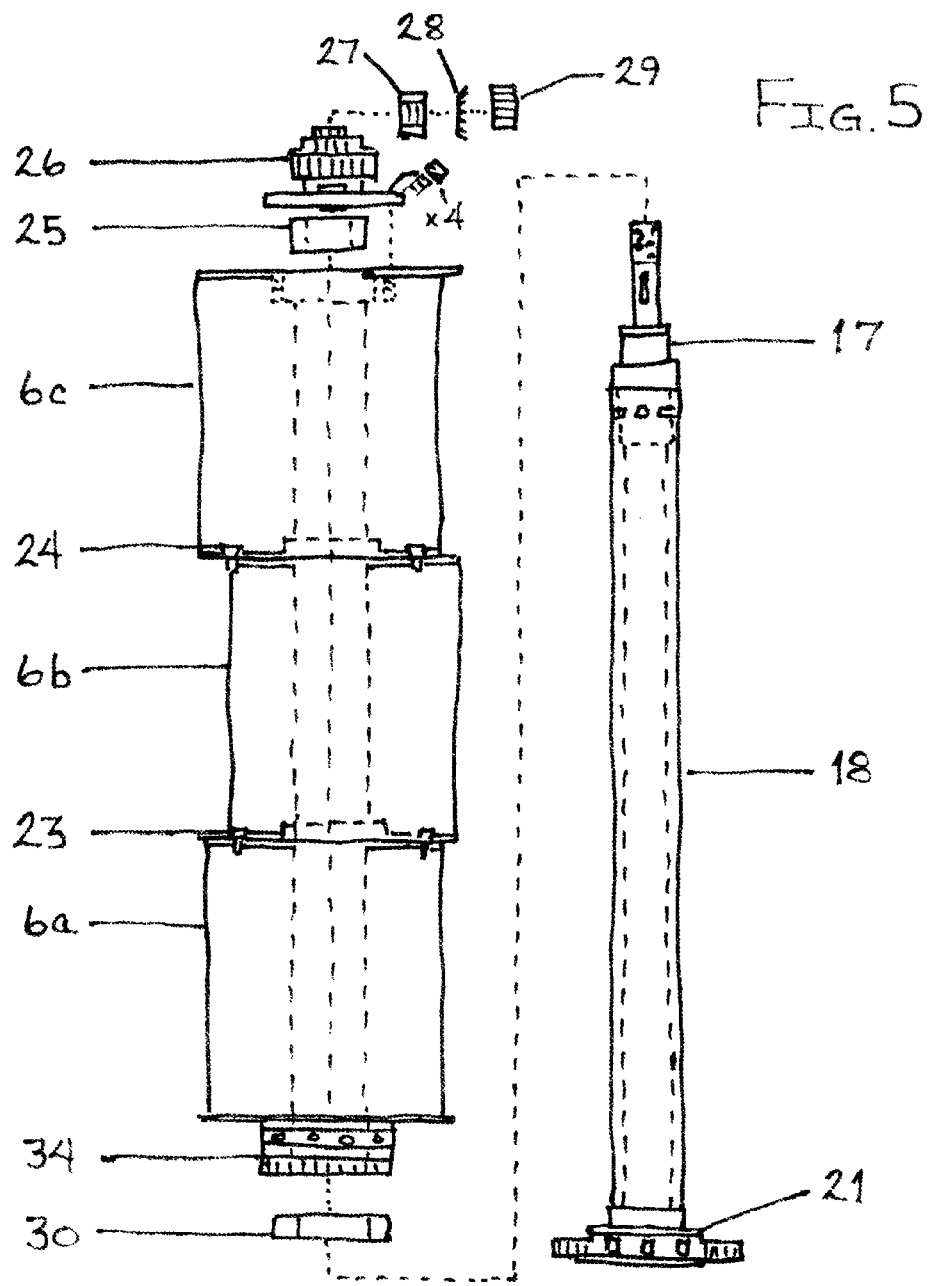

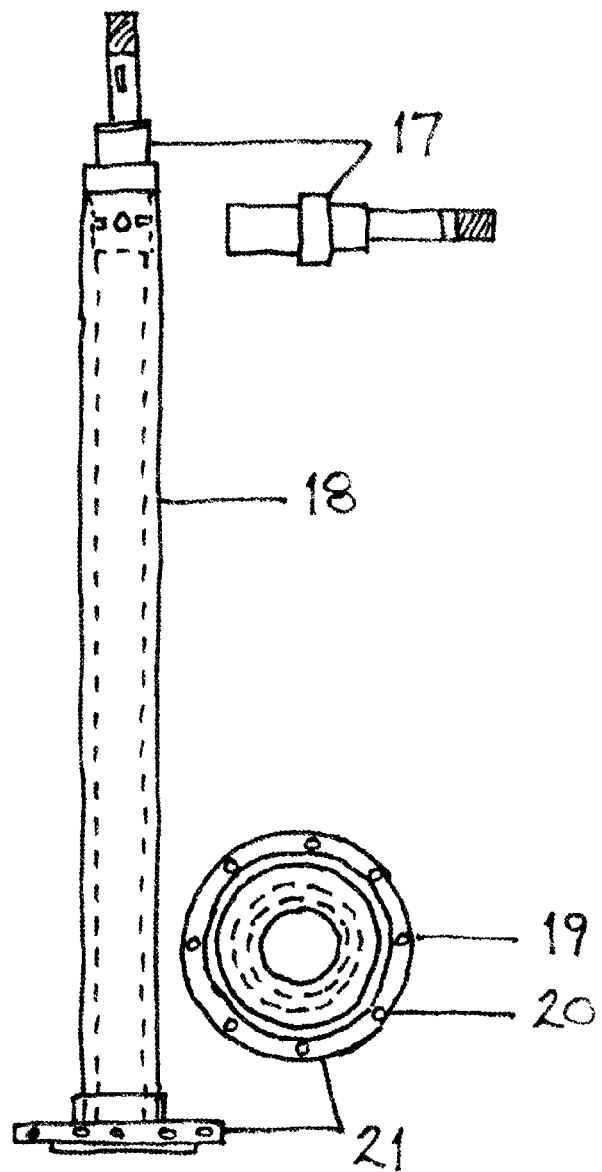

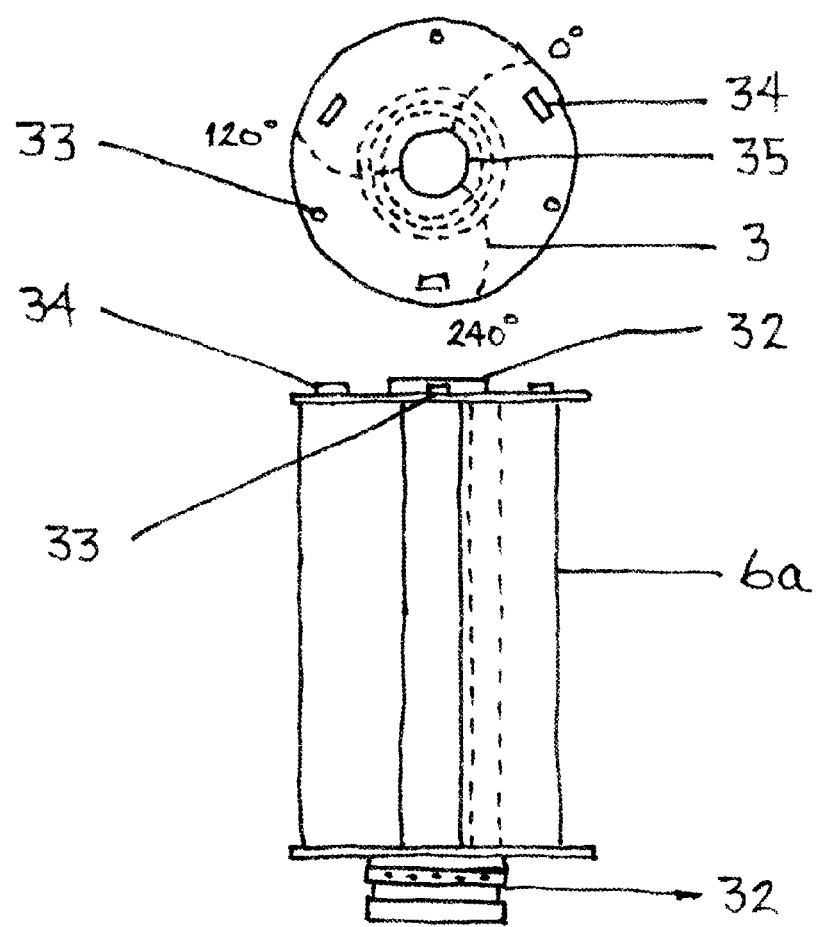

ENCLOSED VERTICAL AXIS FLUID ROTOR

BACKGROUND

Prior art for wind turbines most commonly seen in photographs and video, and having a horizontal axis, suffers from several problems. Foremost is that it is not very efficient in terms of C-sub-p or maximum power coefficient unless made in large scale, suitable only for some geographical areas. These devices also require auxiliary equipment to align the rotating axis constantly with the current wind direction, and separately to start the rotation when wind resumes after a period of nil or small wind.

Vertical axis wind turbines have been taught and have the advantage of not requiring external alignment and start-up equipment, but they have been relatively inefficient. There has been a need for an efficient vertical axis wind turbine that can be erected with small dimensions, suitable for suburban or possibly even urban installation while producing enough electric power to be economically worthwhile to install.

The vertical wind turbine of VanDerHye et al., U.S. Pat. No. 7,314,346, differs from the one disclosed here in two respects, although both are based on the well-known Savonius design first disclosed in U.S. Pat. No. 1,697,574. First, the VanDerHye device requires careful manufacture of the blades to a precise mathematical formula, which is an economic drawback. Second, the VanDerHye device has blades that are not enclosed top and bottom and thus allow air (or other driving fluid) to spill out of the blades and reduce efficiency. The device disclosed here uses an enclosed design (top and bottom of each blade set or rotor) to prevent that.

Like the Benesh design, first disclosed in U.S. Pat. No. 5,494,407, the blades in the current invention are fixed to upper and lower plates. However, unlike 407, here there are no linear (in cross section) or flat portions of the blades, or any overlap where a blade is parallel to another blade. Moreover, here the turbine consists of not one but three or more blade-sets, angularly offset from one another.

The enclosed vertical axis fluid rotor acting as a wind turbine disclosed here is self-starting, needs minimal alignment, and operates efficiently at a wide range of wind or water current speeds (producing more electric power at higher speeds). It produces substantial power in relatively small size scales, but can be scaled up readily. It is suitable for operation in both air current (wind) and water current.

SUMMARY OF THE INVENTION

This invention consists of a set of three blade-sets or rotors, each of equal height, rotating about a common vertical axis, with each blade-set enclosed by circular horizontal plates. Each blade-set consists of three same-sized rectangular blades or sails emanating from the center axis and rigidly attached at equal approximately 120 degree angles to the circular enclosing plates at their tops and bottoms. Each blade is formed as the natural result of bending the blade material to fit its actual length into a distance between approximately 40% and 60% of the distance from the rotation axis to the edge of the attached top and bottom plate.

Each blade-set is rotated from the next so that the second is rotated approximately 20-60 degrees from the first, such that the concavity of the second blade set is behind that of the first, and the third is still another approximately 20-60 degrees behind the second or approximately 40-120 degrees behind the first. Beyond the third blade-set it is possible (although not shown in the figures) to have a plurality of additional stages.

A person having ordinary skill in the relevant art will see that the device disclosed here can be built in either clockwise or anti-clockwise parities (as seen from the top), which are fully equivalent.

Such a person will also see that the turbine disclosed here differs from the non-enclosed VanDerHye design.

Such a person will additionally see that the design can be used efficiently in reverse, as a pump or a fan.

Such a person will see that the blade-set (rotor) design is such that when air or other fluid spills out of a given blade, once it no longer directly faces incoming air or fluid, that air other fluid operates by Bernoulli effect on the rear of the neighbor blade, adding to the power imparted to the rotor system.

And such a person will see that the design in its preferred embodiment uses a hollow non-rotating shaft. This shaft is static, with the overall blade assembly rotating about it on bearings. This reduces blade vibration and transmission, so blade material fatigue is much reduced, and very little noise emanates from the shaft, keeping overall noise to a minimum. This arrangement also reduces weight compared with a solid shaft.

BRIEF DESCRIPTION OF THE DRAWINGS

FIG. 4 is an expanded view that illustrates one embodiment of the assembly of the fluid rotor.

FIG. 5 is an expanded view that illustrates one embodiment of the assembly of the static shaft, complete rotor assembly, and bearings and brake assemblies.

FIG. 6 is a plane view that illustrates one embodiment of the shaft with details of the bottom plate.

FIG. 7 is a top and side view that illustrates one embodiment of the rotor assembly.

DETAILED DESCRIPTION OF THE PREFERRED EMBODIMENTS

Figure 1:
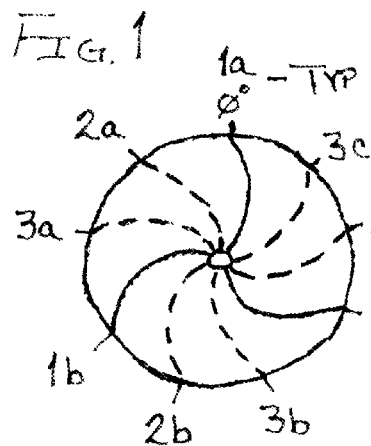
FIG. 1 is a schematic view that illustrates one embodiment of the blades and the three-stage design of a fluid rotor.

FIG. 1 is a schematic view of the blades (constructed for clockwise rotation), showing the three-stage design. There are three blades to each stage or rotor in the preferred embodiment. These blades are spaced at approximately 120 degrees apart. Top view first stage, blade-set 1-1a, 1b, and 1c are approximately 120 degrees apart at 0 degrees rotation. Second stage blades, blade-set 2-2a, 2b, and 2c are approximately 120 degrees apart at 20-60 degrees counter clockwise rotation from the first stage (40 degrees in preferred embodiment). Third stage blades, blade-set 3-3a, 3b, and 3c are approximately 120 degrees apart at 40-120 degrees counter clockwise rotation from the first stage (80 degrees in preferred embodiment).

Figure 2:
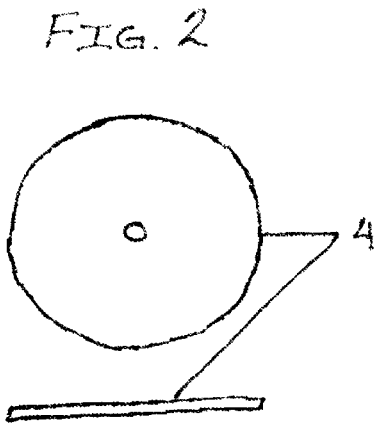
FIG. 2 is a top and side view that illustrates one embodiment of the circular plates assembled on the top and bottom of each stage of the fluid rotor.

FIG. 2 shows the circular plates 4 in top and side views that hollow shaft 5 goes through. Typically, four such plates make up all the stages of the rotor, attaching in total three sets of blades. Plate 4 shows the hole which receives the shaft 5 to which the plates are attached.

Figure 3:
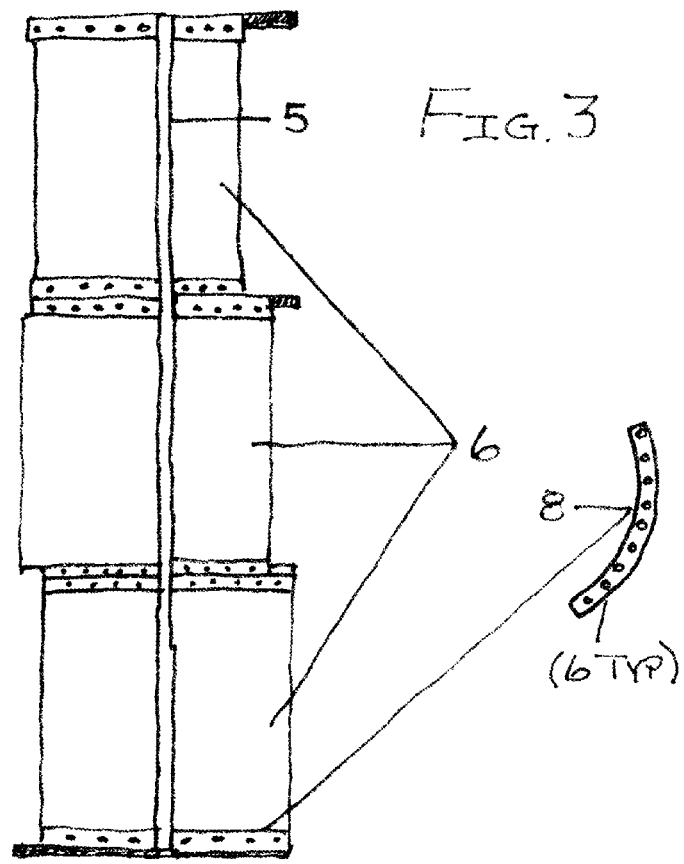
FIG. 3 is a plane view that illustrates one embodiment of the assembled rotation portion of the fluid rotor.

FIG. 3 shows a plane view of the assembled rotating portion of the turbine. Shaft 5 attaches to 6 the three stages of the preferred embodiment to each other. Components 8 are formers, shown in top view, pre-bent shapes in aluminum or other material attached to the top and bottom of blades (preferably welded) and to the plate 4 by welding. There are six formers per stage, two per blade set, eighteen formers for the three stages. The blades are also attached (welded in the preferred embodiment) to the hollow shaft 5.

FIG. 4 is an assembly diagram of the entire turbine. It includes these components: hollow shaft 5 runs through plates 4 and through 6 (which is the turbine embodiment), 11 (which is the bottom bearing keyed shaft driver) is then inserted into 5, spring pin 10 goes through 5 and 11, 11 is then inserted into ER bearing 12 which is locked onto 11 by set screw, 12 is lightly pressed into 13 (which is the bottom bearing adjustment plate) and is then bolted to 14 (which is the base). At the top of embodiment 6 which shaft 5 goes through 16 (which is the upper bearing shaft) is then inserted into 5 at the top and spring pin 15 is inserted through 5 and 16, 16 then goes through 17 (which is the upper bearing adjustment mount), 16 then goes through 18 (which is the upper adjustment bearing plate), 18 is then bolted to 17, 19 is an ER bearing which is lightly pressed into 18 (which is the upper adjustable bearing housing), is then locked with set screw onto 16, and 20 are four tubular braces that are equally spaced and welded to 14 and to 17 (which are the braces for the total embodiment).

This is the description of the drawings of the second embodiment of the same invention. FIG. 1 and FIG. 2 are the same as described above.

The blades run on a rotation axis that allows the blades to be engaged by fluid at any angle and will produce rotation at any approximate perpendicular direction of fluid. (The blades can be constructed for anti-clockwise rotation with no change in function, the choice for the drawings is arbitrary.)

FIG. 5 is an assembly drawing of the static shaft, complete rotor assembly and bearings and brake assemblies. Specifically, 18, hollow shaft (composite materials in preferred embodiment), is attached at the bottom to 21, hub, preferably by welding or bolting. Stub shaft 17 is attached to 18 by bolts and holds bearing 25. In turn, 25 is keyed to hydraulic brake 26, which limits the rotation speed of rotor assembly 6 at high wind/fluid speeds. The top assembly of the shaft is completed by 27, spring or pre-load bushing, 28, lock washer, and 29, bearing nut that adjusts 25. The rotor assembly 6 consists of lower rotor 6a, middle rotor 6b, and top rotor 6c. In the preferred embodiment, each rotor is molded or extruded from plastic or composite material for low weight and durability. Each such rotor combines the blades plus upper and lower circular plates as shown in FIG. 7. The rotors are attached to one another in an angularly offset fashion (see FIG. 1) using lugs 34 and bolts 33.

FIG. 6 shows just the assembly with details of bottom plate 21 including holes 19 and thread holes 20. The threaded holes allow adjusting bolts to adjust the entire unit to be exactly vertical when attached to a bottom plate (not shown) by 21.

FIG. 7 shows how the three rotors 6a, 6b, and 6c are attached pairwise, using lugs 34 and bolts 33 passed through the circular top and bottom plates molded into each rotor. The precise angular location of the lugs establishes the angular offsets between the three rotors.

What is claimed is:

1. A fluid rotor, comprising:
   a shaft that rotates about an axis running from a first end of the shaft to a second end of the shaft;
   a blade assembly attached to the shaft, the blade assembly including at least three blade stages, each blade stage comprising:
   at least three blades in a configuration that locates each blade at equal distances around a central axis of each blade stage, each blade having a shape that is a convex airfoil extending from the central axis of each blade stage in a radial direction with a concave back, the shape allowing fluid to push on the concave side of each blade, and pull on the convex side of each blade;
   an upper plate attached to an upper portion of each blade stage, the upper plate including a central hub for receiving the shaft, and attaching the upper plate to the shaft; and
   a lower plate attached to a lower portion of each blade stage, the lower plate including a central hub for receiving the shaft, and attaching the lower plate to the shaft,
   wherein said at least three blade stages are stacked to align the central hub of each upper plate, the central axis of each blade stage, and the central hub of each lower plate with the axis of the shaft;
   an upper bearing mount attached to the first end of the shaft;
   a lower bearing mount attached to a base, the lower bearing mount receiving the second end of the shaft; and
   a set of braces in a configuration that locates each brace at equal distances around the axis of the shaft, a first end of each brace attaching to the upper bearing mount, and a second end of each brace attaching to the base.

2. The fluid rotor of claim 1, wherein the shaft is a hollow shaft.

3. The fluid rotor of claim 1, wherein said at least three blades in each blade stage are located at approximately 0 degrees, 120 degrees, and 240 degrees about the central axis of the hub.

4. The fluid rotor of claim 1, wherein the location of said at least three blades in each blade stage are offset at equal distances about the central axis of the hub from each other stage.

5. The fluid rotor of claim 1, wherein said at least three blades in a first blade stage of said at least three blade stages are located at approximately 0 degrees, 120 degrees, and 240 degrees about the central axis of the hub, said at least three blades in a second blade stage of said at least three blade stages are located at approximately 40 degrees, 160 degrees, and 280 degrees about the central axis of the hub, and said at least three blades in a third blade stage of said at least three blade stages are located at approximately 80 degrees, 200 degrees, and 320 degrees about the central axis of the hub.

6. The fluid rotor of claim 1, wherein the lower plate of a first blade stage of said at least three blade stages is the upper plate of a second blade stage of said at least three blade stages, and wherein the lower plate of the second blade stage of said at least three blade stages is the upper plate of a third blade stage of said at least three blade stages.

7. The fluid rotor of claim 1, wherein the lower plate of a first blade stage of said at least three blade stages is attached to the upper plate of a second blade stage of said at least three blade stages, and wherein the lower plate of the second blade stage of said at least three blade stages is attached to the upper plate of a third blade stage of said at least three blade stages.

8. The fluid rotor of claim 1, wherein the upper bearing mount further comprises:
   an upper bearing shaft attached to the first end of the shaft;
   an upper bearing adjustment mount that is mounted on the upper bearing shaft;
   an upper bearing adjustment bearing plate that is mounted on the upper bearing shaft; and
   an upper bearing that is mounted on the upper bearing shaft.

9. The fluid rotor of claim 8, wherein the upper bearing is at least one of a ball bearing, air bearing, and magnetic levitation bearing that effectuate radial movement about the axis of the shaft.

10. The fluid rotor of claim 8, wherein the first end of each brace is attached to the upper bearing adjustment mount.

11. The fluid rotor of claim 1, wherein the lower bearing mount further comprises:
- a lower bearing keyed shaft driver attached to the second end of the shaft;
- a lower bearing that receives the lower bearing keyed shaft driver; and
- a lower bearing adjustment plate that receives the lower bearing, the lower bearing adjustment plate attached to the base.

12. The fluid rotor of claim 11, wherein the lower bearing is at least one of a ball bearing, air bearing, and magnetic levitation bearing that effectuate radial movement about the axis of the shaft.

13. The fluid rotor of claim 1, further comprising:
- a hydraulic brake that is attached to the lower bearing mount to limit the rotational speed of the shaft and the blade assembly to a maximum speed.

14. The fluid rotor of claim 1, further comprising:
- a generator that utilizes rotational energy from the shaft and the blade assembly to generate power in an enclosed cycle system.

\* \* \* \* \*